United States Patent

[11] 3,608,913

| [72] | Inventor | Andre D'Assignies<br>Saint-Etienne, France |
|---|---|---|
| [21] | Appl. No. | 878,333 |
| [22] | Filed | Nov. 20, 1969 |
| [45] | Patented | Sept. 28, 1971 |
| [73] | Assignee | Industrial Development Company<br>Establishments<br>Vaduz, Liechtenstein |
| [32] | Priority | Nov. 22, 1968 |
| [33] | | France |
| [31] | | 50663 |

[54] GLAND FOR PISTON-CYLINDER ASSEMBLY AND THE LIKE
10 Claims, 10 Drawing Figs.

[52] U.S. Cl. .................................................. 277/165,
277/206 A
[51] Int. Cl. ...................................................... F16j 15/37
[50] Field of Search ........................................... 277/61, 63,
106, 138, 147, 165, 206, 206.1 A

[56] References Cited
UNITED STATES PATENTS

| 2,888,281 | 5/1959 | Ratti............................. | 277/206 A |
| 2,173,247 | 9/1939 | Bott.............................. | 277/206 A |
| 3,098,660 | 7/1963 | Hausner........................ | 277/206 A |
| 3,288,475 | 11/1966 | Benoit.......................... | 277/206 A |

FOREIGN PATENTS

| 738,055 | 10/1955 | Great Britain................ | 277/165 |

Primary Examiner—Robert I. Smith
Attorney—Karl F. Ross

ABSTRACT: A fluid cylinder traversed by a piston rod has a peripheral recess formed between two axially spaced, relatively adjustable annular members. Clamped within this recess is an annular gasket of relatively stiff elastic material having on one face an annular rib abutting against one of these members and bearing through a membranelike central zone of the gasket upon a resilient ring of more readily deformable material lodged in a groove flanked by two annular beads on the opposite gasket face. The rib is flanked by a pair of annular lips separated from it by respective annular incisions and facing in the direction of fluid pressure, one lip bearing upon the piston rod while the other rests against the peripheral wall of the recess; the beads flanking the groove form integral extensions of the two lips to compress the deformable ring between them upon a splaying of the lips.

PATENTED SEP 28 1971 3,608,913
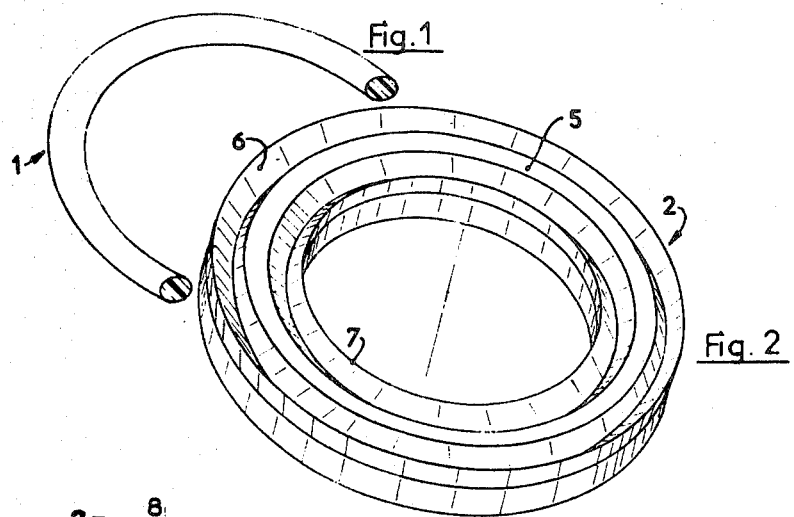
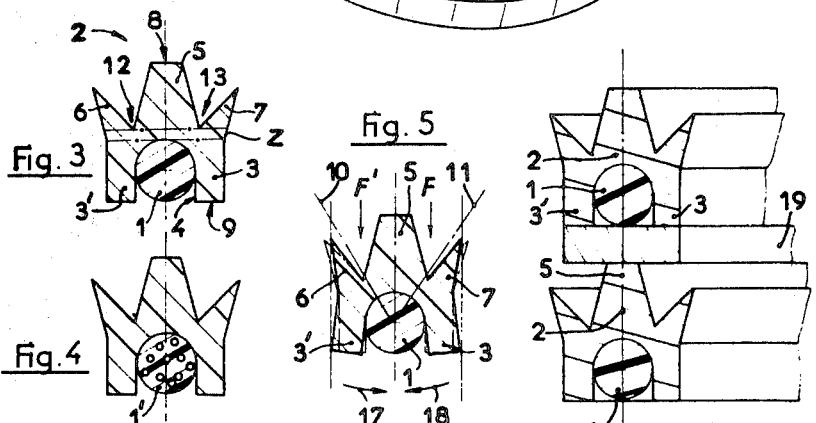
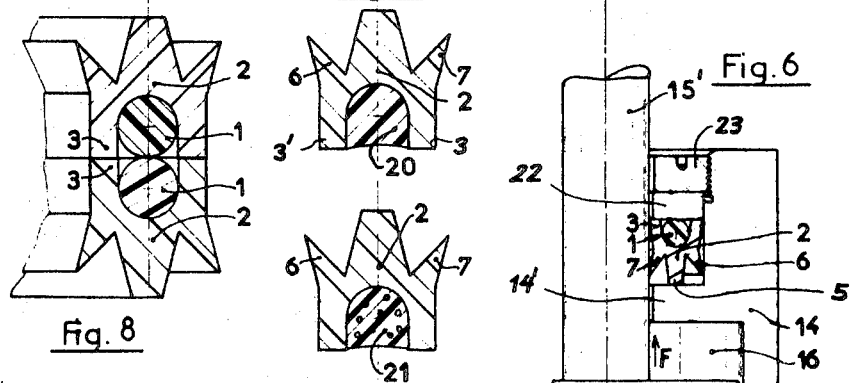
INVENTOR:
André d'Assignies
BY
Karl J. Ross
ATTORNEY

GLAND FOR PISTON-CYLINDER ASSEMBLY AND THE LIKE

My present invention relates to a packing gland for sealing two relatively movable cylindrical surfaces, such as the cylinder and piston surfaces of a hydraulic or pneumatic jack, against axial fluid flow.

This general object of my invention is to provide a gland of this type effective to prevent the escape of fluid over a wide range of operating temperatures and fluid pressures.

A more particular object is to provide a gland which, while utilizing the resiliency of elastomeric materials conventionally employed for such purpose, is not susceptible to rapid deterioration even where the controlled fluid (e.g. oil) is liable to attack the elastomer.

These objects are realized, in accordance with the present invention, by the provision of a packing gland whose annular body consists of a relatively stiff elastic material forming a central membrane with a pair of opposite faces, this membrane being integral with an annular rib on one of its faces and with at least one annular lip alongside that rib, the lip being aligned with an annular bead forming an extension thereof on the other face of the membrane so as to be movable therewith as a unit, with reference to the membrane in response to the axial pressure of a fluid acting upon the first-mentioned face. This fluid, intruding between the lip and the rib which projects axially beyond the latter, urges the lip into firm contact with the coacting cylinder surface; the resulting radial deflection of the lip is communicated to the bead on the opposite face which therefore tends to swing away from that cylinder surface. Such reverse swing, however, it resisted by a ring of a more readily deformable resilient material which lies next to the bead and the membrane in line with the rib so as to be compressed thereby within its recess upon the application of axial clamping pressure to the gland body.

As the deformable ring lies on the side averted from the space containing the working fluid, it is not subject to destructive attack by that fluid and may therefore be made of any suitable natural or synthetic rubber or other elastomeric material. The relatively stiff material of the gland body may consist of a synthetic resin preferably having a low coefficient of friction, e.g., polyurethane or a superpolyamide (nylon).

Advantageously, pursuant to a more specific feature of my invention, the annular lip is duplicated on the opposite side of the somewhat larger rib and is aligned with a second bead on the opposite membrance face, the two beads defining a groove accommodating the more highly deformable ring. A gland of this description may be used either on an outer or on an inner cylindrical contact surface. The invention will be described in greater detail hereinafter with reference to the accompanying drawing in which:

FIG. 1 is a fragmentary perspective view of a deformable ring constituting part of a packing gland according to the invention;

FIG. 2 is a perspective view of the gland body;

FIG. 3 is a cross-sectional view of the assembled elements of FIGS. 1 and 2;

FIG. 4 is a view similar to FIG. 3 illustrating a modification;

FIG. 5 is another view similar to FIG. 3, illustrating the deformation of the gland body under fluid pressure;

FIG. 6 is an axial sectional view of a gland as shown in FIGS. 1–3 included in a fluid seal between a cylinder and a piston;

FIG. 7 is a fragmentary sectional view of a packing assembly including a pair of glands of the type shown in FIGS. 1–3;

FIG. 8 is a view similar to FIG. 7, illustrating a modified assembly; and

FIG. 9 and 10 are further cross-sectional views similar to FIG. 3, showing additional modification.

A packing gland as shown in FIGS. 1–3 comprises an elastomeric ring 1 of circular cross section and an annular gasket 2 of elastic but relatively stiff material such as the synthetic resins mentioned above. The body of gasket 2 includes a thin central zone Z, FIG. 3, which acts as a membrance and whose lower face (as viewed in FIG. 3) has an inner and an outer bead 3, 3' defining between them an annular groove 4 which accommodates the ring 1. The opposite face of the membrance is formed with a flat-topped central annular rib 5 flanked by an outer and an inner rib 6, 7 separated from the lip 5 by a pair of annular incisions 12, 13 of generally triangular cross section; the ribs themselves are substantially wedge shaped and terminate below the level of the plateau 8 of rib 5.

As shown in FIG. 4, the ring 1 of solid elastomeric material may be replaced by a ring 1' of cellular material such as foam rubber or expanded plastic.

As illustrated in FIG. 5, fluid pressure (represented by arrows F and F') acts upon the gaps between rib 5 and lips 6, 7 to splay these lips whereby they are deflected, together with their respective extensions 3 and 3', with reference to lines 10 and 11 as indicated by arrows 17 and 18; reference lines 10 and 11 pass through regions of minimum thickness by which the two flanks 3, 6 and 3', 7 are hingedly connected with the remainder of the gasket body.

As illustrated at FIG. 6, the gland shown in FIGS. 1–3 and 5 (or, alternately, one of its modifications as shown in FIG. 4 and subsequent FIGS.) is clamped between a pair of relatively axially adjustable annular members, i.e., a shoulder 14' of a cylinder 14 and another shoulder formed by a metal ring 22, within a peripheral recess of cylinder 14 bounded by these two shoulders. A clamping ring 23 is screwed into the threaded end of cylinder 14 to exert axial pressure upon the assembly 1, 2 through the intermediary of ring 22. A piston 15, having a rod 15' embraced by the gland 1, 2, defines with cylinder 14 a fluid space 16 to be sealed by the gland against the outer atmosphere. The pressure F of the fluid in space 16 acts upon the lip 7, in the manner illustrated in FIG. 5, to urge it onto the surface of piston rod 15' with the gap 12 (FIG. 3) isolated from this fluid space by the lip 5, little if any pressure acts upon the outer lip 6. The inward deformation of lip 7 results in an outward deformation of bead 3 resisted by the ring 1 which, serving as a cushion for the fluid force, is compressed between the gasket 2 and the ring 22.

As illustrated in FIG. 7, the sealing effect may be further enhanced by mounting two or more glands in tandem within the same recess of a cylinder or piston surface, with interposition of an annular, preferably metallic, spacer 19. In this instance, as in the arrangement of FIG. 6, it is assumed that fluid tends to leak out only in one axial direction (here from above).

In FIG. 8, which applies to the situation where high-pressure fluid may be present on both sides of the seal, I have shown two glands of the aforedescribed type in relatively inverted position, with their deformable rings 1 contacting each other. Thus, as in the preceding cases, the more fluid-resistant material of the gasket body protects each of the elastomeric rings against chemical attack.

FIG. 9 shows the toroidal ring 1 or 1' of the preceding FIGS. replaced by a ring 20 directly molded within the body 2 so as to be bonded thereto; the exposed surface of ring 20 is flush with the edges of the adjoining beads 3, 3'.

FIG. 10 shows a similar molded ring 21 which, like the removable ring 1' of FIG. 4, consists of cellular material.

I claim:

1. A packing gland for sealing two relatively movable cylindrical surfaces against axial fluid flow, comprising an annular body of relatively stiff elastic material forming a central membrane with a pair of opposite faces, an annular rib integral with said membrane on one of said faces, an annular lip integral with said membrane separated radially from said rib on said one of said faces, the other of said faces being provided with an annular bead forming an axial extension of said lip beyond said membrane, said rib projecting axially beyond said lip, and a ring of more readily deformable resilient material adjacent said membrane and said bead aligned with said rib and compressible thereby against said bead upon an axial clamping of said body between two parallel annular shoulders.

2. A gland as defined in claim 1 wherein said body is further provided with a second lip at said one of said faces on the side of said rib remote from the first-mentioned lip, said other of said faces being provided with a second annular bead forming an axial extension of said second lip beyond said membrane, said beads defining between them an annular groove receiving said ring, and lips being substantially axially coextensive.

3. A gland as defined in claim 2 wherein said lips are of substantially wedge-shaped profile and are separated from said rib by annular incisions of generally triangular cross section.

4. A gland as defined in claim 2 wherein said ring is removably lodged between said beads.

5. A gland as defined in claim 1 wherein said ring is bonded onto said body.

6. A gland as defined in claim 1 wherein said ring is of circular cross section.

7. A gland as defined in claim 1 wherein said ring consists of cellular material.

8. A packing for sealing two relatively movable cylindrical surfaces against axial fluid flow, one of said surfaces being formed with an axially extending recess bounded by two relatively adjustable annular shoulders, comprising at least one gland as defined in claim 1 wedged between said members in said recess with said lip contacting the other of said surfaces and extending axially toward a region of higher fluid pressure.

9. A packing as defined in claim 8, further comprising a second gland as defined in claim 1 wedged in said recess adjacent the first-mentioned gland.

10. A packing as defined in claim 9, further comprising a rigid annular spacer slidably inserted in said recess adjacent the first and interposed between said glands.